| United States Patent [19] | [11] Patent Number: 5,039,731 |
| Warren et al. | [45] Date of Patent: Aug. 13, 1991 |

[54] METAL COATING COMPOSITIONS INCLUDING LINEAR POLYESTER POLYURETHANE

[75] Inventors: Patrick A. Warren, Erie; Kenneth E. Fleming, Edinboro; Douglas H. Mowrey, Pleasantville, all of Pa.

[73] Assignee: Lord Corporation, Erie, Pa.

[21] Appl. No.: 420,855

[22] Filed: Oct. 13, 1989

Related U.S. Application Data

[63] Continuation-in-part of Ser. No. 232,208, Aug. 15, 1988, Pat. No. 4,914,149, which is a continuation-in-part of Ser. No. 920,558, Oct. 20, 1986, Pat. No. 4,769,413.

[51] Int. Cl.$^5$ .............................................. C09K 75/00
[52] U.S. Cl. .................................. 524/507; 524/509; 524/511; 525/123
[58] Field of Search ............... 524/125, 507, 509, 511; 525/123

[56] References Cited

U.S. PATENT DOCUMENTS 2,432,148 12/1947 Furness et al. ........................ 260/43
3,104,236 9/1963 Lavin et al. ........................ 260/45.1
3,438,922 4/1969 Ueno et al. ........................ 260/29.3
4,173,594 11/1979 Dyszlewski ........................ 525/498

FOREIGN PATENT DOCUMENTS 2040293 1/1980 United Kingdom .

OTHER PUBLICATIONS

Chemical Abstract C84-063124, Sanyo Chemical Ind. Ltd., re Plastisol Compsn. Providing Firmly Bonded Coating-Contains Vinyl Chloride Copolymer, Plasticizer and Tackifier.

*Primary Examiner*—Joseph L. Schofer
*Assistant Examiner*—Peter D. Mulcahy

[57] ABSTRACT

A coating composition comprises 0.1 to 10% by weight of a linear polyester polyurethane, 2 to 25% by weight of at least one organic solvent-soluble phenolic resin, 3 to 18% by weight of a halogenated resin selected from the group consisting of halogenated rubber, halogenated polyolefins and halogenated vinyl halide polymers and an inert solvent in an amount sufficient to provide an adhesive primer having a solids content of 10 to 70% by weight.

15 Claims, No Drawings

METAL COATING COMPOSITIONS INCLUDING LINEAR POLYESTER POLYURETHANE

This application is a continuation-in-part of application Ser. No. 07/232,208, filed Aug. 15, 1988, now U.S. Pat. No. 4,914,149, which is a continuation-in-part of application Ser. No. 06/920,558, filed Oct. 20, 1986, now U.S. Pat. No. 4,769,413.

This invention relates to novel polymeric coating compositions. More particularly, the invention relates to thermosetting coating compositions possessing both flexibility and corrosion resistant properties.

Those industries engaged in the manufacture of articles requiring the application of coatings for protective, decorative or other utilitarian purposes have increasingly turned to coatings that when applied to the article in its preformed condition, withstand the stresses of subsequent article-forming operations. Coating preformed stock is particularly important to those industries engaged in fabricating parts from metal sheet stock such as appliance cabinets, automobile body parts, metal siding, to name just a few. Typically, the coating is applied to a metal coil in a continuous operation offering sizeable advantages to the manufacture in the overall economics of coating and providing an ability to control the quality of the product not easily available through other coating techniques. Accordingly, coil coating is a preferred approach for coating articles to be manufactured from metal coil or flat stock. However, the development of suitable coating formulations that can be applied as a coil coating, maintain their integrity during metal forming operations and still provide the protection, decorativeness or other require utility is a substantial challenge to those skilled in the art of coating formulation.

The combination of requirements imposed upon the properties of a satisfactory coil coating composition frequently cannot be met with a single formulation. Often, multiple coats of differing compositions are applied sequentially each providing a facet of protection or decorativeness not otherwise achievable in a single formulation. For metals, a primer coating is usually required which provides a stronger adhesive bond passivating corrosion protection, and a barrier between the metal surface and the finished coating layer with which it must also form a strong adhesive bond. Primers for coil coating must also be flexible to accommodate metal forming operations without loss of metal to primer adhesion. But in formulating a primer coating that will possess the above required properties, the formulator must also consider the requirement that the primer must also form a strong adhesive bond with the finish coating and that this adhesive bond must be sufficiently strong to survive the extensive stresses imposed thereon during subsequent metal forming operations. In this sense, the primer and subsequent or finished coats must be highly compatible.

Primer coatings also find considerable utility in what is commonly referred to as tie-coating compositions. Tie-coatings have special use in rubber to metal bonding where the metal substrate is first coated with the primer before it is bonded by adhesive to a rubber or other substrates. Primers which have tie-coating characteristics that enhance the bonding between the metal to the adhesive are highly desirable, especially where they combine this property with those of flexibility and corrosion protection.

The foregoing compositional problems, particularly as regards metal coatings and specifically metal adhesion primers, illustrate the challenge facing workers in the field of coil coating formulation. Metal adhesion primers are known which possess excellent corrosion resistance, but have little flexibility for metals which will be bent in subsequent processing. Others of these primers possess excellent flexibility but lack long term resistance of the bonded assembly to environmental exposure, such as salt spray. Yet others of these primers exhibit less than the desired adhesiveness. The invention described herein is directed to a resolution of the aforementioned problems and constitutes a surprising advancement in the composition of primer coatings, especially metal adhesion primers for coil coating.

A further complication in the formulation of primers and coil coatings is the recent discoveries regarding the need to maintain a manufacturing environment free from chemical agents that may be harmful to a worker's health. For the coil coating industry, new coating formulations must take into account these environmental constraints and assure that chemical agents thought to be injurious cannot be released into the plant environment as a by-product of the coating process.

It is an object of this invention, therefore, to provide a novel coating composition with both outstanding flexibility and corrosion protection for metals.

Another object of this invention is to provide an isocyanate free urethane containing coating composition that can be applied in a manner harmonious with the goal of an environmentally safe work place.

A further object of this invention is to provide an improved primer coating for coil coating processes.

Yet another object of the invention is to provide a primer useful as a tie-coating in metal to rubber bondings.

These and other objects of the invention are obtained by a coating composition comprising:
  A. about 0.1 to 10% by weight, preferably 1 to 5% by weight, of linear polyester polyurethane;
  B. about 2 to 25% by weight, preferably about 8 to 15% by weight, of at least one organic solvent-soluble phenolic resin;
  C. about 3 to 18% by weight, preferably about 5 to 12% by weight of a halogenated resin selected from the group consisting of halogenated rubber, halogenated polyolefins and halogenated vinyl halide polymers; and
  D. inert solvent in an amount sufficient to provide an adhesive primer having a solids content in the range of about 10 to 70%;
said weight percent of components A, B and C being based on the combined weights of components A, B, C and D.

Optionally, the compositions of the invention may contain fillers, pigments and the like conventional additives.

In another aspect of the invention, adhesive primers which are both flexible and corrosion resistant are formed by simply drying films or coatings of the compositions of the invention.

The linear polyester polyurethane which can be employed in the coating compositions of the present invention comprise the reaction product between a stoichiometric excess of at least one linear polyester having two active hydrogen atoms and a polyisocyanate. Generally such polyurethanes will be prepared by reacting a hydroxy-terminated polyester with a diisocyanate or other polyisocyanate having up to eight functional isocyanate groups. The linear polyesters are formed from bifunctional monomers having either aliphatic or aromatic segments therein. Linear polyesters are low molecular weight (<3500) hydroxyl-terminated polymers produced by using an excess of hydroxyl equivalents. Typically hydroxyl:carboxyl ratios range from 2:1 to 15:14.

An extensive description of some of the useful techniques for preparing isocyanate-functional urethanes can be found in Saunders and Frisch: *Polyurethanes, Chemistry and Technology*, Part II, Interscience (New York 1964), especially at pages 8 to 49, and in the references cited therein. Other preparative techniques which are known in the art can also be employed. Generally, the polyurethane employed in the practice of this invention has a molecular weight of at least 50,000, particularly greater than 100,000 being preferred.

Any of the polyisocyanates having at least two reactive isocyanate groups can be employed in forming isocyanate-functional urethanes suitable for use in the practice of the invention. Such polyisocyanates include, without limitation, aliphatic polyisocyanates such as 1,6-hexamethylene diisocyanate; 1,8-octamethylene diisocyanate; 1,12-dodecamethylene diisocyanate; 2,2,4-trimethylhexamethylene diisocyanate; and the like; 3,3'diisocyanatodipropyl ether; 3-isocyanatomethyl-3,5,5'-trimethylcyclohexyl isocyanate; cyclopentalene-1,3-diisocyanate; cyclohexylene-1,4-diisocyanate; methyl 2,6-diisocyanatocaprolate; bis-(2-isocyanatoethyl)-fumarate; 4-methyl-1,3-diisocyanatocyclohexane; trans-vinylene diisocyanate and similar unsaturated polyisocyanates; 4,4'-methylene-bis-(cyclohexylisocyanate) and related polyisocyanates; methane diisocyanates; bis-(2-isocyanatoethyl) carbonate and similar carbonate polyisocyanates; N,N'N''-tris-(6-isocyanatohexamethylene) biuret and related polyisocyanates; as well as other known polyisocyanates derived from aliphatic polyamines; aromatic polyisocyanates such as toluene diisocyanates; xylene diisocyanates; dianisidine diisocyanate; 4,4'-diphenylmethane diisocyanate; 1-ethoxy-2,4-diisocyanatobenzene; 1-chloro-2,4-diisocyanatobenzene; tris(4-isocyanatophenyl) methane; naphthalene diisocyanates; 4,4'-biphenyl diisocyanate; phenylene diisocyanates; 3,3'-dimethyl-4,4'-biphenyl diisocynate; p-isocyanatobenzoyl isocyanate; tetrachloro-1,3-phenylene diisocyanate; and the like.

At the present time, the preferred isocyanate-functional urethanes are the reaction products of toluene diisocyanate.

As the phenolic resin there can be employed the organic solvent-soluble heat-reactive condensation product of an aldehyde having from 1 to 8 carbon atoms, such as formaldehyde, acetaldehyde, isobutyraldehyde, ethylhexaldehyde, and the like, with phenolic compounds such as phenol, o-cresol, m-cresol, p-cresol, mixed cresols, e.g., cresylic acid and m-cresol and/or p-cresol, xylenol, diphenylolpropane, p-butylphenol, p-tert-amylphenol, p-octylphenol, p,p'-dihydroxydiphenylether, and the like. Mixtures of dissimilar phenolic resins can be used. Presently preferred are mixtures of phenol formaldehyde resin and phenol formaldehyde resin modified with a cresol.

The phenolic resin will preferably be formed in a conventional manner from the condensation of from about 0.8 to about 5 mols of aldehyde per mol of phenolic compound in the presence of basic, neutral or acidic catalysts to afford an organic solvent-soluble resin having a molecular weight in the range from about 300 to about 2,000, preferably about 300 to about 1,200. The phenolic resin is preferably compatible with the blocked polyurethane component, and hence it is important that the phenolic resin be soluble in an inert organic solvent system which is compatible with the blocked polyurethane component.

The halogenated resin component of the invention can be either a halogenated natural or synthetic material. Generally, the halogenated resins have an inherent viscosity above 100 centipoise at 20% concentration in toluene and a halogen content of 58 to 65% by weight. The polymers are preferably halogenated with chlorine but bromine and fluorine can be used as well.

Examples of suitable halogenated synthetic rubbers are halogenated polymers selected from dienes having 4 to 8 carbon atoms such as halogenated polybutadiene, halogenated polyisoprene, halogenated polyhexadiene and the like. The preferred halogenated polydiene is chlorinated polyisoprene. Halogenated articles are well known articles of commerce and need not be discussed here in detail.

The halogenated polyolefins include, for example, halogenated polyethylene, halogenated polypropylene and halogenated polybutylene as well as halogenated copolymers of dissimilar alpha-olefins of 2 to 8 carbon atoms. The preferred halogenated polyolefins are chlorinated polyethylene and chlorinated polypropylene.

The halogenated vinyl halide polymers include halogenated homopolymers or copolymers of vinyl halide. These halogenated materials can be made by post-halogenating the vinyl-halide resin, preferably by post-chlorinating polyvinylchloride. Such materials are commercially available and include, for instance, Genchlor S and Genchlor T, manufactured by Imperial Chemical Industries, Ltd.

The novel coating compositions of the present invention comprised of the phenolic resin, the linear polyester urethane and the halogenated rubber may be pre-blended for subsequent dissolution in a substantially anhydrous organic solvent medium. In most instances, however, the components are all simultaneously dissolved in the organic solvent to prepare a coating composition ready for application. Any nonreactive volatile, mutual or compatible solvent for the resinous components may be used, such as ethylene dichloride, trichloroethylene, and the like, including mixed solvent systems comprising ketones, hydrocarbons, esters and the like. In selecting the urethane, phenolic resin and solvent system, it is an important criterion that the selected ingredients be sufficiently compatible so as to form an essentially homogeneous admixture. The solvent system will generally be present in an amount sufficient to provide an admixture of resinous components in solvent at a total solids content in the range from about 10 to about 70, preferably from about 25 to about 65, percent.

As previously noted, the compositions of the invention can include conventional additives such as pigments, fillers, and the like; with such additives being used in conventional amounts. Particularly preferred additives include titanium dioxide, zinc oxide and carbon black and fillers such as silica. Optional ingredients may further include sulfur or selenium.

The novel coating compositions of the invention can be applied to a variety of substrates including steel, stainless steel, aluminum, zinc, and other metals by conventional techniques of brushing, spraying, flow-coating, dip-coating, roller-coating, or electrodeposition. After the coating is applied, coatings having excellent flexibility and corrosion resistance as well as other desired properties such as ready reception to overcoats and in particular to adhesives such as are used in metal to rubber bonding are obtained by drying the coating at an elevated temperature sufficient to drive off the solvent. The dryings cycles may vary over a wide range of time and temperature to suit the coatings as well as manufacturing constraints which may be imposed upon the process for other reasons. Typical drying temperatures fall in the range of about 350° to 425° F. peak metal temperature.

The following example is included to further describe the invention.

EXAMPLE

A primer composition was prepared according to the following recipe:

| Ingredient | Wt. % of Total |
| --- | --- |
| 1. Linear polyester polyurethane based on TDI (a) | 1. |
| 2. Chlorinated rubber (b) | 5.1 |
| 3. Phenol formaldehyde Resin @ 70% TSC | 6.1 |
| 4. Phenol formaldehyde Resin modified with 12.5% ortho cresol @ 70% TSC | 6.1 |
| 5. Carbon Black | 1. |
| 6. Silica | 1.2 |
| 7. TiO₂ | 2.6 |
| 8. Zinc Oxide | 5.1 |
| 9. Selenium | 1. |
| 10. Methyl Isobutyl Ketone | 70.6 |

(a) A polyurethan having a molecular weight of 207,000 weight average commercially available as Desmocoll 400 from Mobay.
(b) Chlorinated polyisoprene rubber (approx. 64% Cl).

The ingredients were combined in a conventional manner by high shear mixing with the temperature being maintained below 55° C. to obtain a homogeneous fluid. The thus-prepared primer composition was coated onto aluminum coil stock (treated with a pre-paint conversion coating), dried to a peak metal temperature of 200° C. and cooled to provide a coating having a dry film thickness of 0.15 mil. The thus-coated aluminum stock was divided into two groups.

One group was subjected to the T bend test per National Coil Coaters Association Test No. II-19. The T-bend results were 0 or 1, indicating excellent adhesion and flexibility.

The other group was bonded to styrene/butadiene rubber (SBR) with a conventional rubber to metal adhesive to form rubber to aluminum assemblies. The assemblies were subjected to the 72 hour salt spray test (ASTM B 117) to test the primer for resistance to corrosion. Bond results were excellent, i.e., 90–100% rubber retention.

It is claimed:

1. A coating composition comprising
    A. about 0.1 to 10% by weight of a linear polyester polyurethane which is the reaction product of a stoichiometric excess of at least one linear polyester having two active hydrogen atoms and a polyisocyanate;
    B. about 2 to 25% by weight of at least one organic solvent-soluble phenolic resin;
    C. about 3 to 18% by weight of a halogenated resin selected from the group consisting of halogenated rubber, halogenated polyolefins and halogenated vinyl halide polymers; and
    D. an inert solvent in an amount sufficient to provide an adhesive primer having a solids content in the range of about 10 to 70%;

said weight percent of components A, B and C being based on the combined weights of components A, B, C and D.

2. A coating composition according to claim 1 wherein the polyurethane is prepared by reaction of a polyester linear polyol and a diisocyanate.

3. A coating composition according to claim 2 wherein the polyurethane is prepared by reaction of toluene diisocyanate.

4. A coating composition according to claim 1 wherein the phenolic resin comprises the reaction product of at least one aromatic hydroxy compound and an aldehyde having from 1 to 8 carbon atoms.

5. A coating composition according to claim 4 wherein the hydroxy compound is phenol.

6. A coating composition according to claim 1 wherein said phenolic resin comprises a mixture of phenol formaldehyde resin and a phenol-formaldehyde resin modified with 10 to 20% cresol.

7. A coating composition according to claim 1 wherein the halogenated resin is halogenated rubber.

8. A coating composition according to claim 7 wherein the halogenated rubber is a halogenated synthetic polydiene.

9. A coating composition according to claim 8 wherein the halogenated polydiene is a halogenated polymer of a diene of 4 to 8 carbon atoms.

10. A coating composition according to claim 8 wherein the halogenated polydiene is chlorinated polydiene.

11. A coating composition according to claim 10 wherein the chlorinated polydiene is chlorinated isoprene.

12. A coating composition according to claim 1 wherein the halogenated resin is a halogenated vinyl halide polymer.

13. A coating composition according to claim 12 wherein the halogenated vinyl halide polymer is post-chlorinated polyvinyl chloride.

14. The coating composition of claim 1, comprising
    A. about 0.1 to 10% by weight of the linear polyester polyurethane;
    B. about 8 to 15% by weight of the organic solvent-soluble phenolic resin; and
    C. about 5 to 12% by weight of the halogenated resin.

15. A coating composition according to claim 1 further comprising selenium or sulfur.

* * * * *